(12) United States Patent
Allen et al.

(10) Patent No.: US 8,941,282 B2
(45) Date of Patent: Jan. 27, 2015

(54) TURBINE GENERATOR STATOR CORE ATTACHMENT TECHNIQUE

(75) Inventors: David T. Allen, Longwood, FL (US); Josue Marrero, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 366 days.

(21) Appl. No.: 13/411,747

(22) Filed: Mar. 5, 2012

(65) Prior Publication Data
US 2013/0229084 A1 Sep. 5, 2013

(51) Int. Cl.
*H02K 1/08* (2006.01)
*H02K 1/18* (2006.01)
*H02K 1/16* (2006.01)

(52) U.S. Cl.
CPC .................. *H02K 1/185* (2013.01); *H02K 1/16* (2013.01); *H02K 1/18* (2013.01)
USPC ...... 310/216.008; 310/216.044; 310/216.045; 310/216.048; 310/216.049; 310/216.052; 310/216.135

(58) Field of Classification Search
CPC ............ H02K 1/16; H02K 1/18; H02K 1/185
USPC .................... 310/216.008, 216.044, 216.045, 310/216.048, 216.049, 216.135, 216.052
IPC ......................................................... H02K 1/08
See application file for complete search history.

(56) References Cited

U.S. PATENT DOCUMENTS

| | | | | |
|---|---|---|---|---|
| 2,846,603 A | * | 8/1958 | Webster et al. | 310/433 |
| 3,465,188 A | * | 9/1969 | Sisk | 310/216.004 |
| 3,466,518 A | * | 9/1969 | Aylikci et al. | 318/685 |
| 3,474,527 A | * | 10/1969 | Meyer | 29/596 |
| 5,491,371 A | * | 2/1996 | Ooi | 310/58 |
| 6,346,760 B1 | | 2/2002 | Boardman | |
| 6,498,417 B2 | | 12/2002 | Fuller | |
| 6,628,027 B2 | | 9/2003 | Fuller | |
| 6,930,427 B2 | | 8/2005 | Grant | |
| 7,397,163 B2 | | 7/2008 | Cook | |
| 7,714,477 B2 | | 5/2010 | Nagashima | |
| 7,839,049 B2 | | 11/2010 | Jansen | |
| 2002/0074884 A1 | | 6/2002 | Fuller | |
| 2004/0124731 A1 | * | 7/2004 | Kimura et al. | 310/216 |
| 2006/0125339 A1 | | 6/2006 | Hahn et al. | |
| 2009/0072655 A1 | * | 3/2009 | Sano et al. | 310/217 |
| 2010/0007236 A1 | * | 1/2010 | Sano et al. | 310/216.135 |
| 2010/0253161 A1 | | 10/2010 | Kuroyanagi | |
| 2012/0080965 A1 | * | 4/2012 | Bradfield | 310/58 |
| 2013/0229084 A1 | * | 9/2013 | Allen et al. | 310/216.008 |

FOREIGN PATENT DOCUMENTS

| | | |
|---|---|---|
| DE | 1488663 A1 | 4/1969 |
| DE | 102012209589 A1 | 12/2013 |
| EP | 0793332 A1 | 9/1997 |
| EP | 1384893 A2 | 1/2004 |
| FR | 2793084 A1 | 11/2000 |

* cited by examiner

*Primary Examiner* — John K Kim

(57) ABSTRACT

A stator core (105) including tabbed laminations (100) stacked face-to-face to form a plurality of tabbed lamination modules (107), with each tabbed lamination including a first tab (102) and a second tab (104) extending from a circumferential edge of the lamination. Non-tabbed laminations are also stacked face-to-face to form a plurality of non-tabbed lamination modules (109), each non-tabbed lamination lacking a tab. The tabbed lamination modules are stacked face-to-face in an alternating configuration with non-tabbed lamination modules. The tabs are used to attach the stator core to an inside surface of an electrical generator frame (2), such as by attaching the tabs to frame support rings (4) of the generator frame.

17 Claims, 4 Drawing Sheets

TURBINE GENERATOR STATOR CORE ATTACHMENT TECHNIQUE

FIELD OF THE INVENTION

The present invention relates to electric power generators and more specifically to methods and apparatuses for attaching a stator core to a generator frame.

BACKGROUND OF THE INVENTION

The generator stator core is the largest monobloc component in a turbine-generator set. The stator core comprises thousands of thin steel laminations horizontally stacked and clamped together to form a cylindrical stator core disposed within a generator frame. Each lamination defines a central opening and thus when stacked, an axial opening extends through the core. The laminations are held together by a plurality of axial through-bolts that extend from end-to-end through the core.

A rotor is disposed within the central opening and mechanically rotated by a rotating turbine. The rotor is responsive to an electrical current such that rotation generates electric current in stator windings. The stator current is supplied to electrical loads through a transmission and distribution system.

Steady-state and transient forces generated during normal operation and transient conditions impose substantial forces on the stator core. These forces can also distort the core geometric shape, cause the laminations to vibrate, and damage the core, rotor and/or frame. Also, mechanical fatigue caused by these forces can lead to premature failure of the generator.

According to one prior art technique, the individual laminations, or a plurality of laminations in the form of a donut, engage keybars disposed on an inside surface of the generator frame. The keybars are rod-like or bar-like members that extend a length of the frame. An outwardly-facing surface of each keybar is attached to internal frame structures (e.g., frame rings). An inwardly-facing surface of each keybar comprises a projection that engages axial grooves in the outer circumference of the laminations (donuts).

Prior art FIG. 1 is a cutaway view of a prior art generator frame 2 prior to insertion of the stator core (i.e., stator core laminations or donuts). Keybars 6 having a dovetail cross-section extend the axial length of the frame 2 and are attached to generator frame support rings 4 via a transition adapter plate 5 (see prior art FIG. 2). The support rings 4 are in turn welded to the generator frame 2. The generator frame 2 is fixed to a stable support such as the floor of a power plant (not shown).

The laminations and keybars are engaged by mating complementary notches as shown in FIG. 2. A plurality of notches 12 are defined in a circumferential surface of a lamination 10. The notches 12 match a complementary profile of the keybars 6. When a plurality of laminations 10 is stacked horizontally the aligned notches form an axial groove, with several axial grooves formed in a circumference of the core. To assemble the stator core, the laminations 10 are slid onto the keybars 6. Since the keybars 6 are affixed to the generator fame 2 and the frame is attached to the power plant floor, the core and its constituent laminations are stabilized.

Since the stator core vibrates during operation, with large magnitude vibrations occurring during power system transients, it is critical for the keybars 6 to be rigidly affixed to both the laminations 10 and to the generator frame 2.

Prior art FIGS. 3 and 4 illustrate structural components for both maintaining circumferential alignment of the laminations and attaching the stator core to the generator frame. A stator core 21 comprises a plurality of horizontally-stacked module assemblies 20, each module assembly comprising a plurality of laminations. Each lamination module assembly 20 further defines a plurality of grooves 23 (see FIG. 4) formed in a circumferential surface thereof by the alignment of notches formed in the circumferential surface of each lamination. An end plate is disposed at each end of the core 21; only one end plate 63 illustrated in FIG. 3.

Each lamination defines a central opening for receiving stator windings. Thus each module assembly 20 and the stator core 21 also define the central opening for receiving the stator windings.

Through bolts 44A and mating nuts 44B (shown on only one end of the core 21 in FIG. 3) extend a length of the core 21 and cooperate to exert inwardly-directed axial clamping forces on the end plates and the lamination module assemblies 20.

A keybar 50 is disposed within each groove 23 of the lamination module assemblies 20, with a relatively tight fit clearance between the keybar and the groove. This tight fit prevents movement of the module assemblies 20 in a circumferential direction. Each keybar 50 comprises a threaded stud terminal portion 50A for receiving a mating nut 50B that is urged against the end plates 63 to maintain the circumferential alignment of the module assemblies 20. The keybar 50 extends the full axial length of the core 21.

According to this embodiment, to attach the stator core 21 to the generator frame a first plurality of axially aligned keybar attachment assemblies 60 are disposed between and attached to two adjacent keybars 50 as shown in FIG. 3. A second plurality of axially aligned keybar attachment assemblies (not shown in FIG. 3) are disposed about 180 circumferential degrees from the first plurality of keybar attachment assemblies.

The cross-sectional view of FIG. 4 illustrates a key bar attachment assembly 60 and a keybar attachment assembly 70 disposed at about 180 circumferential degrees apart. The keybar attachment assemblies 60 and 70 are attached to the keybars 50 by a fastener such as a bolt or screw 85. Each keybar attachment assembly 60/70 spans between two adjacent keybars 50 as illustrated in FIG. 3.

Each keybar attachment assembly 60/70 further comprises a groove 60A/70A for receiving a spring bar 86/88. The spring bars 86/88 extend the axial length of the core 21 and each is welded to frame support rings, such as the support rings 4 illustrated in FIG. 1. The spring bars 86/88 are affixed within the grooves 60A/70A by a weldment or a fastener. This arrangement of structural components rigidly attaches the stator core 21 to the generator frame.

FIG. 5 is a partial perspective view illustrating the components associated with another technique for attaching the stator core to the generator frame. A bracket 90 comprises a notched portion 91 and a base portion 92. A keybar 94 is received within a groove of a block 93. Fasteners 96 attach the base portion 91 to the block 93 and to the keybars 94. An axial spring bar 98 is disposed within a notch of the notched portion 91 and welded to the frame rings of the generator core. In one embodiment the frame rings define notches therein for receiving the spring bars 98.

Typically, a first set of three brackets 90 are attached at three axially aligned locations along the stator core. A second set of three brackets 90 are attached at three axially aligned locations separated by 180 degrees from the location of the first set of three notched brackets.

Combinations of the various core-to-frame-attachment techniques described herein can also be utilized to maintain alignment of the stator core laminations and to fixedly attach the core to the generator frame.

Unfortunately, to accommodate the various different core-to-frame attachment techniques, numerous and different attachment hardware components and weldments are required. Additionally, this technique requires use of multiple high-strength engineered components to provide the necessary precision fit between mating components and to adequately transfer the dead weight and operating loads (caused by both steady-state and transient forces) from the stator core to the generator frame and then to the generator foundation.

In particular as related to the embodiment of FIG. 5, the forces are substantial in the region where the bracket 90 is attached to the keybar 94 via the block 93, especially during fault conditions. The exerted forces and loads produced by these attachment techniques are also difficult to quantitatively and accurately analyze. Additionally, a time-consuming assembly process is necessary to assemble the components.

According to yet another attachment technique, a plurality of steel bands is attached around the girth of the stator core. Tabs extending outwardly from the surface of the stator core are welded to the steel bands. The tabs are then attached to flex springs in the stator frame to complete the core-to-frame-to-foundation attachment assembly. Typically the tab is welded to the flex spring.

Disadvantageously, this last described attachment technique also requires numerous components. It is difficult and time-consuming to pull the steel bands around the core girth then weld them in place. After this step has been completed, the tab is welded to the flex spring, which again requires significant and relatively flawless welding.

Those skilled in the art recognize that given the wide variety of generator styles, sizes and ratings, there are a wide variety of generator frame constructions, stator constructions and core attachment components. It is always desired to utilize technically sound structural components for attaching the core to the frame. These components must provide the necessary structural rigidity (e.g., to limit frame vibrations) during normal operation and during fault conditions. These structural components must also permit the laminations (or donuts comprising a plurality of laminations) to be easily secured to the generator frame. Of course it is also desired to reduce the time and cost expended to manufacture these structural components and reduce the time required and the complexity of the process for attaching the core to the frame.

BRIEF DESCRIPTION OF THE DRAWINGS

The invention is explained in the following description in view of the drawings that show.

DETAILED DESCRIPTION OF THE INVENTION

Stator core laminations are punched from electrical steel sheet. A single typical lamination comprises nine segments (or nine punchings) and thus nine punching operations (also referred to as stamping operations) are required to form the nine segments. A single punching die is used to punch the nine segments for a stator core of a given size and shape. Additional dies are utilized to punch the laminations for differently sized stator cores, where the core size depends on the power rating and size of the generator. This technique is especially valuable and efficient when a large number of identical punchings are required.

Today, most punchings are formed by a laser cutting operation. A cutting die is not required as the laser cutting process is controlled by a software program controlling a multi-axis laser cutter.

The present invention teaches core laminations having at least two tabs extending from a circumferential edge of the lamination. Preferably, the two tabs are disposed at an angular distance of about 180 degrees to optimize transference of the forces exerted on the core to the generator frame.

Figure 1:
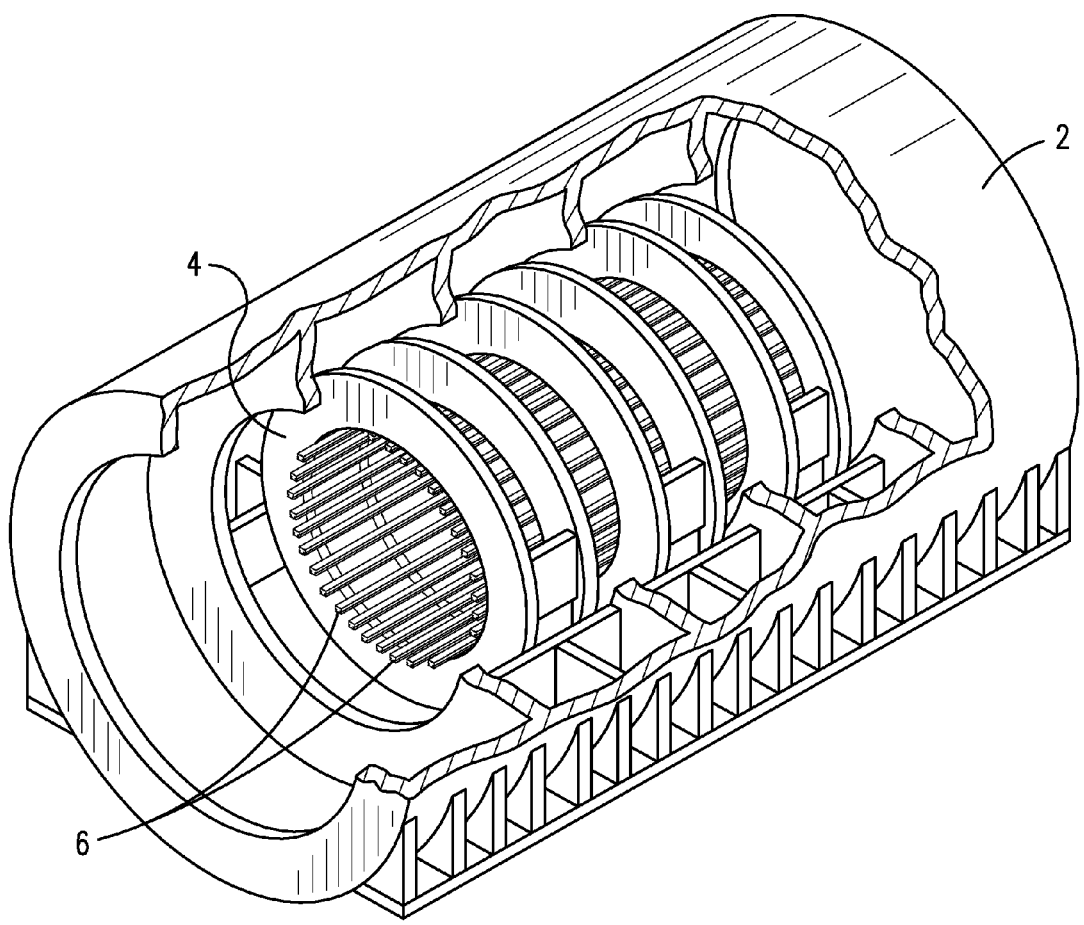
FIG. 1 illustrates a prior art generator frame.
Figure 2:
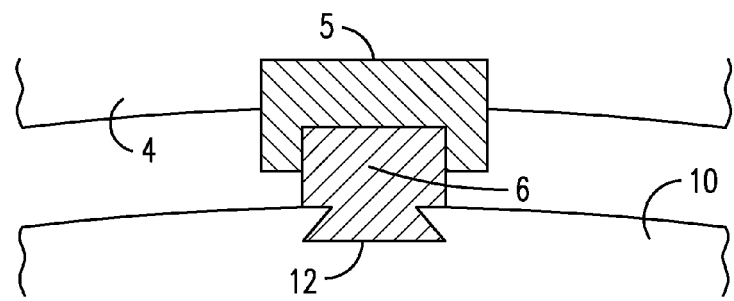
FIG. 2 illustrates details of prior art keybar and associated components, shown generally in FIG. 1, for attaching the stator core to the generator frame.
Figure 6:
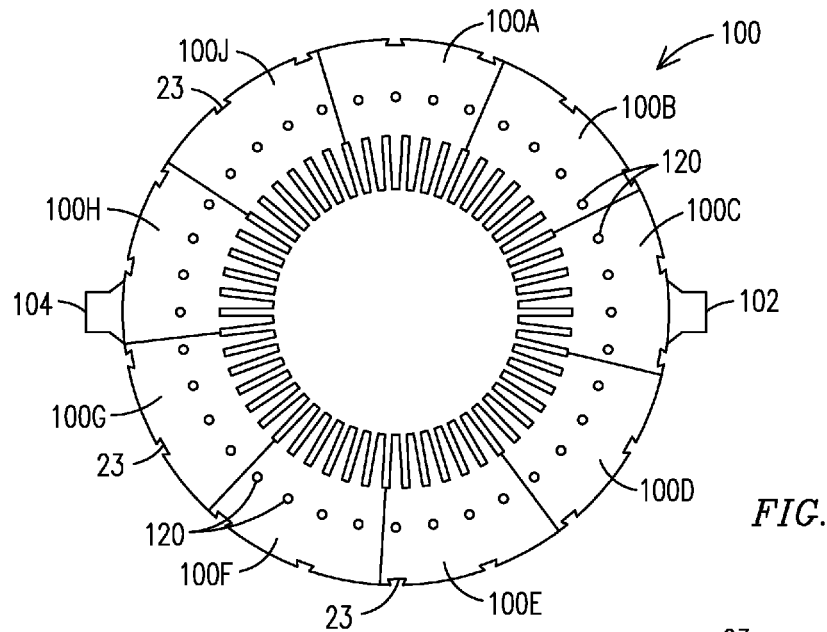
FIG. 6 illustrates a stator core lamination formed according to teachings of the present invention.

FIG. 6 illustrates a lamination 100 comprising individual punchings or lamination segments 100A-100H and 100J. In the illustrated embodiment the lamination 100 comprises nine segments. Other embodiments may comprise more or fewer punching. Punched segments 100C and 100H further comprise respective tabs 102 and 104 for attaching to the generator frame support rings (element 4 in FIG. 1). Generally, the tabs 102 and 104 are clamped or sandwiched between two rigid plates (such as the frame support rings) and attached to the support rings using common mechanical attachment hardware, such as bolts/nuts or rivets.

A tabbed core module 107 (see FIG. 7) comprises a plurality of tabbed laminations (such as the lamination 100) stacked face-to-face. A non-tabbed core module 109 comprises a plurality of non-tabbed laminations (i.e., a lamination absent the tabs 102 and 104) stacked face-to-face.

Figure 7:
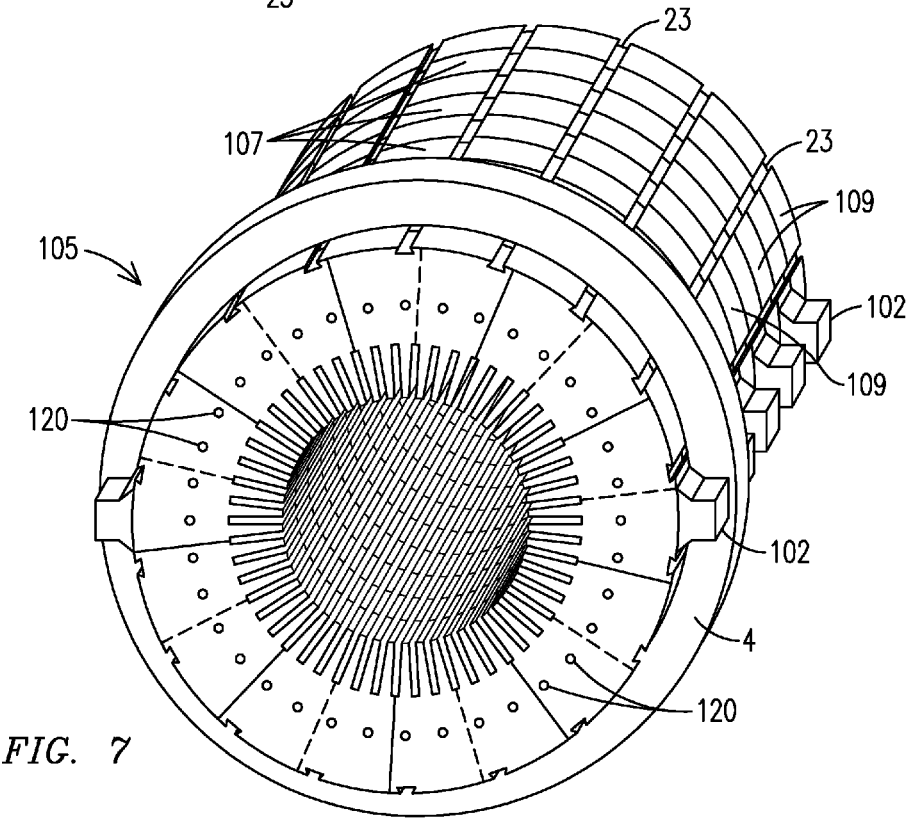
FIG. 7 illustrates a stator core comprising tabbed and non-tabbed laminations according to teachings of the present invention.

According to one embodiment, every lamination in the stator core does not include the tabs 102 or 104 (or every module in the core does not comprise the tabbed module 107). Instead, as illustrated in FIG. 7, a stator core 105 comprises a plurality of tabbed core modules 107 alternating with a plurality of non-tabbed core modules 109. Each lamination in the tabbed modules 107 comprises two tabs, such as the tabs 102 and 104 of FIG. 6. The laminations in the non-tabbed modules 109 do not have tabs. Alternating tabbed and non-tabbed modules may extend a length of the stator core 105 as illustrated in FIG. 7. However, depending on generator and core design and size, the number of tabbed modules 107 may be reduced below the number illustrated in FIG. 7 or tabbed modules 107 may extend the entire length of the stator core.

In one embodiment, an axial length of each tabbed module 107 and each non-tabbed module 109 is about three inches in a core that is about 250 inches long. In one embodiment each lamination is about 0.018" thick and therefore about 116 laminations are stacked to form one of the modules 107 or 109. The axial length of the tabbed and non-tabbed modules can be varied as a function of the stator core length or as a function of other core parameters.

Figure 3:
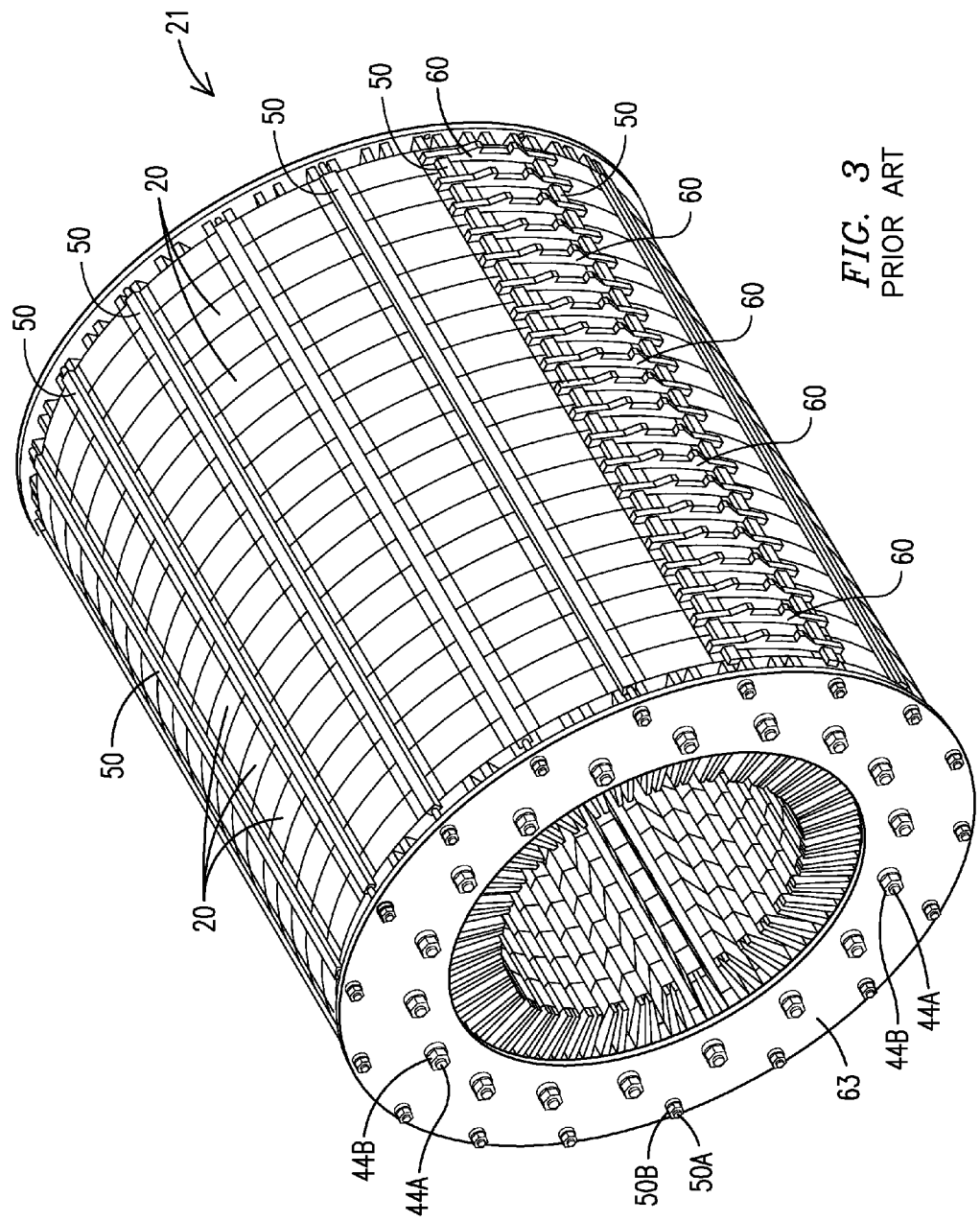
FIG. 3 illustrates a prior art stator core.
Figure 4:
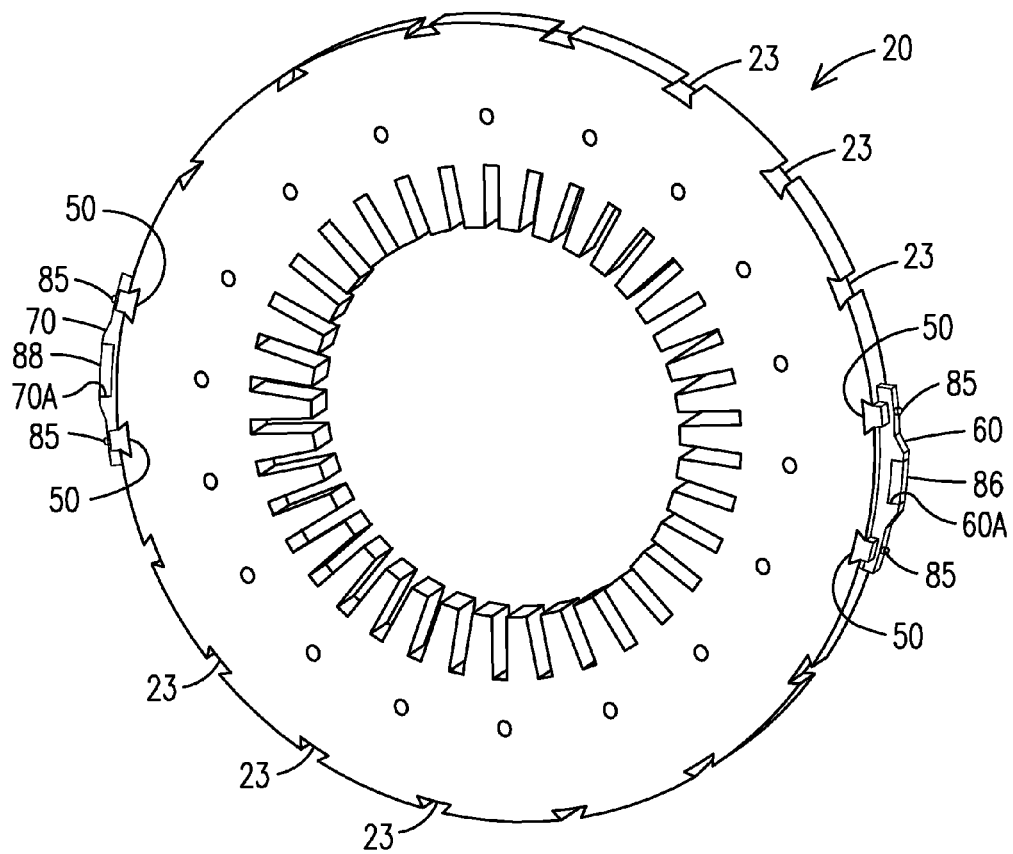
FIG. 4 illustrates one of the prior art stator core module assemblies of FIG. 3.
Figure 5:
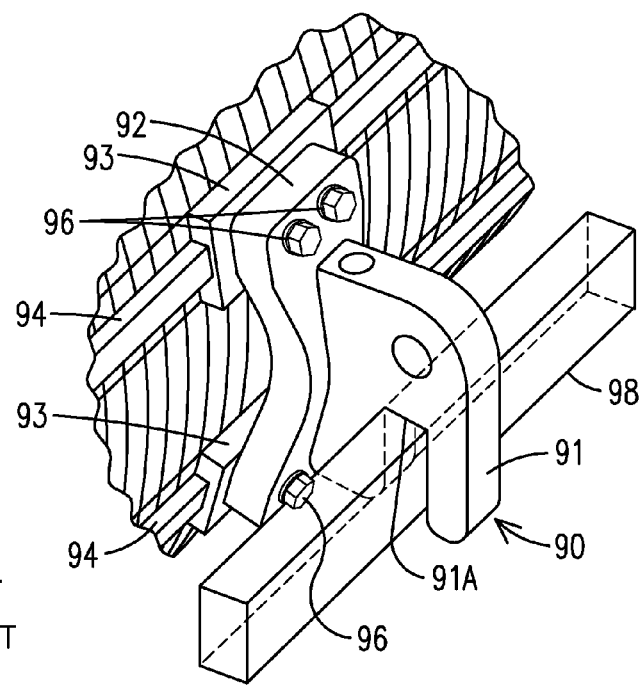
FIG. 5 illustrates a prior art bracket and associated components for attaching the stator core to the generator frame.

FIGS. 6 and 7 both depict the grooves 23 for receiving the keybars as in FIGS. 3 and 4. Here the keybars provide a "squirrel-cage" configuration for the outside surface of the core. The keybars provide protection to the core by collecting circulating currents on the outside surface and thereby preventing the currents from accumulating in one location, which may create a fault to ground.

The teachings of the present invention eliminate the need for the keybar attachment assemblies 60 and 70 and the spring bars 86 and 88 illustrated in the prior art depictions of FIGS. 3 and 4. However, it may be desirable to locate the tabs 102 and 104 and the associated tabbed modules 107 at the same axial locations where the keybar attachment assemblies 60 and 70 are located in the prior at Openings 120 in FIGS. 6 and 7 receive through-bolts (not shown) for axially clamping the individual laminations and lamination modules. In another embodiment the individual laminations and lamination modules are bonded in a global vacuum impregnation system that uses epoxy to provide this additional bonding.

According to one technique for forming the lamination segments 100C and 100H (i.e., the lamination segments comprising the tabs 102 and 104) the tabbed lamination segment 100C is cut from a sheet of electrical steel; the sheet is turned over and the tabbed lamination segment 100H is cut from the remaining sheet material. This technique reduces the amount of material required to fabricate the lamination segments from the steel sheet.

When the laminations are stacked to form the modules 107 and 109 of FIG. 7, in one embodiment a half-lapped stacking technique is used. According to this stacking technique a mating line (or butt joint) between two adjacent punchings of one lamination is offset (by one-half the width of a punching, thus the reference to "half-lapped") from a mating line between two adjacent punchings of an overlying or underlying lamination. For instance, with reference to FIG. 7, a first lamination is oriented with the nine punching as indicated, with the butt joints between abutted laminations indicated by solid lines. The punchings of a second lamination immediately rearward of the first lamination are oriented with the lamination segment butt joints offset by one-half a circumferential distance from the butt joints of the first lamination. Thus the butt joints of the second lamination are shown in phantom in FIG. 7.

As is known by those skilled in the art, other lapping configurations can be used, including one-third lapped (wherein a butt joint between lamination segments in successive laminations are offset about one-third the width of a lamination segment) and spiral lapping (wherein the butt joints in overlying laminations are slightly offset from the butt joint in the underlying or overlying lamination such that the butt joints spiral around a core center line along the axial length of the core.

Benefits of the attachment system of the present invention are numerous. Fewer components are required to attach the stator core to the generator frame than necessary in the prior art attachment systems. For example, fewer keybars are required. In fact, it may be practical to eliminate all keybars. No welding is required according to this technique and assembly time is reduced. Also the shorter force path for transferring loads from the core to the frame results in reduced stresses and fewer potential failure points. Also, the technique can be easily adapted to a robot assembly process in which a robot is programmed to select the necessary lamination segments (including both tabbed and non-tabbed segments) to form a single lamination and stack the formed laminations to form the stator core.

The technique of the present invention, in which certain ones of the lamination segments are different from other segments (e.g., certain lamination segments comprise tabs and others do not), can be employed to form lamination segments that include segments of gas baffles, inner frames, special core-to-frame attachment components and other core features. When the lamination segments are stacked these features are completely formed and are continuous, as required, between adjacent lamination segments and between adjacent individual laminations.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A stator core for affixing to a generator housing comprising:
    tabbed laminations stacked face-to-face to form a tabbed lamination module, each tabbed lamination comprising a first tab and a spaced apart second tab each extending from a circumferential edge of the lamination;
    non-tabbed laminations stacked face-to-face to form a non-tabbed lamination module, the non-tabbed lamination lacking any tabs;
    the non-tabbed lamination module stacked between first and second tabbed lamination modules to form a first gap between first tabs of the first and second tabbed lamination modules, and to form a second gap between second tabs of the first and second tabbed lamination modules;
    an attachment component of the stator housing for receiving within the first gap, and attached to the first tabs of the first and second tabbed lamination modules, and the attachment component for receiving within the second gap and attached to the second tabs of the first and second tabbed lamination modules; and
    wherein each tabbed and non-tabbed lamination defines at least one groove in a circumferential surface thereof, each groove for receiving a keybar.

2. The stator core of claim 1 wherein each tabbed lamination comprises a plurality of lamination segments, wherein the first tab extends from a circumferential edge of a first one of the plurality of lamination segments and the second tab extends from a circumferential edge of a second one of the plurality of the lamination segments.

3. The stator core of claim 2 wherein the plurality of lamination segments comprises nine lamination segments.

4. The stator core of claim 1 wherein each tabbed lamination module is about three inches in axial length and each non-tabbed lamination module is about three inches in axial length.

5. The stator core of claim 1 wherein each non-tabbed lamination comprises a plurality of lamination segments.

6. The stator core of claim 1 further comprising an additional feature formed in one or more of the tabbed and non-tabbed laminations such that when the tabbed and non-tabbed laminations are stacked face-to-face to form the respective tabbed and non-tabbed lamination modules, and when the tabbed and non-tabbed lamination modules are stacked face-to-face to form the stator core, the additional feature is continuous within the stator core.

7. The stator core of claim 6 wherein the additional feature comprises one or more of gas baffles, inner frames and core-to-frame attachment structures.

8. The stator core of claim 1 wherein an angular distance of about 180 degrees separates the first tab and the second tab.

9. The stator core of claim 1 further comprising each tabbed and non-tabbed lamination defining a plurality of openings therethrough, each opening for receiving a through bolt.

10. The stator core of claim 9 further comprising a first and second end plate disposed at opposing ends of the stator core, the through bolt passing through openings in the first and second end plates.

11. The stator core of claim 1 wherein an opening is defined in each tabbed and non-tabbed lamination, stator windings received within the opening.

12. The stator core of claim 1 wherein the attachment component comprises a frame rings disposed on an inside surface of a generator frame.

13. A generator comprising:
a stator core, comprising:
tabbed lamination modules each comprising a plurality of stacked face-to-face tabbed laminations, each tabbed lamination comprising a first and a second tab extending from a circumferential edge of the tabbed lamination;
non-tabbed lamination modules comprising a plurality of stacked face-to-face non-tabbed laminations;
tabbed lamination modules stacked face-to-face in an alternating configuration with non-tabbed lamination modules forming a gap region between first tabs disposed face-to-face in a first tabbed lamination module and first tabs disposed face-to-face in a second tabbed lamination module with a non-tabbed lamination module disposed therebetween, and forming a second gap between second tabs disposed face-to-face in the first tabbed lamination module and second tabs disposed face-to-face in the second tabbed lamination module with the non-tabbed lamination module disposed therebetween;
frame rings attached to an internal surface of a generator frame, and received within the first and second gaps, the first and second tabs secured to the frame rings to attach the stator core to the generator frame; and a rotor rotating proximate the stator core and magnetically coupled thereto.

14. The generator of claim 13 wherein each tabbed lamination comprises a plurality of lamination segments, wherein the first tab extends from a circumferential edge of a first one of the plurality of lamination segments and the second tab extends from a circumferential edge of a second one of the plurality of the lamination segments.

15. The generator of claim 13 further comprising an additional feature formed in one or more of the tabbed and non-tabbed laminations such that when the tabbed and non-tabbed laminations are stacked face-to-face to form the stator core, the additional feature is continuous within the stator core.

16. The generator of claim 15 wherein the additional feature comprises one or more of gas baffles, inner frames and core-to-frame attachment structures.

17. The generator of claim 13 wherein an angular distance of about 180 degrees separates the first tab and the second tab.

* * * * *